US011667037B2

United States Patent
Wang

(10) Patent No.: US 11,667,037 B2
(45) Date of Patent: Jun. 6, 2023

(54) ROBOT SYSTEM WITH HAND-GUIDING FUNCTION

(71) Applicant: TECHMAN ROBOT INC., Taoyuan (TW)

(72) Inventor: Pei-Jui Wang, Taoyuan (TW)

(73) Assignee: TECHMAN ROBOT INC., Taoyuan (TW)

( * ) Notice: Subject to any disclaimer, the term of this patent is extended or adjusted under 35 U.S.C. 154(b) by 151 days.

(21) Appl. No.: 17/460,276

(22) Filed: Aug. 29, 2021

(65) Prior Publication Data

US 2022/0111535 A1    Apr. 14, 2022

(30) Foreign Application Priority Data

Oct. 14, 2020   (TW) ................................. 109135858

(51) Int. Cl.
*B25J 13/02*   (2006.01)
*B25J 9/10*    (2006.01)
*G05B 19/421*  (2006.01)

(52) U.S. Cl.
CPC ............... *B25J 13/02* (2013.01); *B25J 9/106* (2013.01); *G05B 19/421* (2013.01)

(58) Field of Classification Search
CPC . B25J 13/02; B25J 9/106; B25J 19/06; G05B 19/421; G05B 2219/36401; G05B 19/423
See application file for complete search history.

(56) References Cited

U.S. PATENT DOCUMENTS

| | | | |
|---|---|---|---|
| 2019/0126489 A1* | 5/2019 | Wada | B25J 9/163 |
| 2020/0078097 A1* | 3/2020 | Gregerson | A61B 5/1127 |
| 2021/0197366 A1* | 7/2021 | Lavigne | B25J 9/1674 |
| 2022/0040866 A1* | 2/2022 | Nitz | B25J 19/0033 |

* cited by examiner

*Primary Examiner* — Kira Nguyen
(74) *Attorney, Agent, or Firm* — Winston Hsu

(57) ABSTRACT

A robot system with a hand-guiding function is disclosed. The robot system selects the hand-guiding function or non-hand-guiding function of an enable device by a mode option mechanism during the operation of a teach mode or an automatic mode. When selecting the hand-guiding function, the enable device has both the enabling and the hand-guiding function to easily hand-guiding the robot to operate.

10 Claims, 3 Drawing Sheets

ROBOT SYSTEM WITH HAND-GUIDING FUNCTION

BACKGROUND OF THE INVENTION

1. Field of the Invention

The invention is related to a robot system, more particularly to a robot system that allows a user to safely perform a hand-guiding function during a human-machine cooperation.

2. Description of the Prior Art

With rapid development of robot technology, factories use robots to assist operators in processing, assembly line and manufacturing to improve factory production efficiency. However, the operation of robots can seriously affect the safety of human operators. Hence, there are strict regulations to maintain the safety of work environment with collaborative robots.

Please refer to FIG. 3. In the prior art, in order to teach the robot 1 to work, a hand-guiding button 2 is disposed at the end of the robot 1. The hand-guiding button 2 is usually designed as a hold-to-run button or a software button. The hand-guiding button 2 is coupled to the controller 3 of the robot 1 via an electrical or communication connection. When a demonstrator 4 sets the robot 1 in the teaching mode, and the user presses the hand-guiding button 2, a signal is sent to the controller 3 to switch the robot 1 from a stationary state to the hand-guiding mode. There are many ways the hand-guiding mode can operate in the prior art. For example, the encoder of the actuator in each toggle 5 and the motor current sensor can be used to calculate and compensate to get the force applied to each toggle at the end of the robot 1. A force is applied to control the robot 1 to move in compliance with a hand-guiding and the hand-guiding control the robot 1 to a position then recording the position or the hand-guiding to teach the robot 1 by a path to operate then recording the path. When the hand-guiding button 2 is released, the robot 1 is switched back to the stationary state.

In order to comply with the safety standard ISO 10218-1, the aforementioned demonstrator 4 of the prior art robot 1 is equipped with an enable device 6 in the teaching mode to protect the human operator. The enable device 6, which is a three-position enabling switch, is usually disposed in the demonstrator 4. The switch has three pressing positions, released, middle, and pressed. The middle position can enable the robot 1. When the switch is released or pressed, an electrical or communication signal is sent to the controller 3, and the safety system 7 interrupts the teaching behavior and stops the movement of the robot 1. The safety system 7 monitors the robot 1 with standstill monitoring so that the robot 1 does not move when the actuator is still powered. If the monitoring finds that the robot is moving, the safety system 7 will cut off the power to the actuator of the robot 1 to protect the safety of the human operator during the teaching process.

However, although the aforementioned prior art is equipped with the enable device 6 on the demonstrator 4 in accordance with safety standards and regulations, it is installed separately from the hand-guiding button 2 disposed at the end of the robot 1. The two must be pressed at the same time to move the robot in hand-guiding mode. The operator must hold the demonstrator 4 and press the enable device 6 to the middle position with one hand to keep the robot 1 in the stationary state without interrupted by the safety system 7, while the other hand must press the hand-guiding button 2 disposed at the end of the robot 1 in order to operate the robot 1 in hand-guiding mode. For safety reasons, the operation of the robot 1 in hand-guiding mode is extremely inconvenient. Therefore, there are still problems to be solved urgently concerning the safety of the robot system.

SUMMARY OF THE INVENTION

The objective of the invention is to provide a robot system with a hand-guiding function. By using a mode designator, the enable device operates as a hand-guiding enable device, so that the hand-guiding enable device has functions of both enabling and hand-guiding the robot to make the robot to operate with safety and convenience.

The robot system with hand-guiding function includes a robot, a controller, an enable device and a mode designator. The robot includes a plurality of toggles and a movable end. Each of the plurality of toggles includes an actuator. The controller is coupled to the robot for controlling the actuator to move the movable end of the robot. The enable device is coupled to the controller. The mode designator is electrically or communicatively coupled to the controller for designating the enable device to operate in a hand-guiding mode or a non-hand-guiding mode. The controller includes a safety module, electrically or communicatively coupled to the enable device, and outputs a signal according to a switching state of the enable device for making the robot entering a safety mode or canceling the safety mode. When the mode designator designates the enable device to operate in the hand-guiding mode, the controller allows the enable device to have functions of the enable device and a hand-guiding for the robot. When the mode designator designates the enable device to operate in the non-hand-guiding mode, the controller maintains the enable device to its original function.

When the enable device is operating in the hand-guiding mode, the controller allows the enable device as the hand-guiding enable device. When the enable device is turned on (ON state), the safety module cancels the safety mode of the robot and enables the hand-guiding mode of the robot. When the enable device is operating in the hand-guiding mode and the enable device is turned off (OFF state), the safety module stops the robot and makes the robot to enter the safety mode and disables the hand-guiding mode of the robot. When the enable device is operating in the non-hand-guiding mode, and the enable device is turned on (ON state), the safety module cancels the safety mode of the robot, and the hand-guiding mode of the robot is not enabled. When the enable device is turned off (OFF state), the safety module stops the robot and controls the robot to enter the safety mode.

When the robot enters the safety mode, the safety module is electrically or communicatively connected to the position sensor of each toggle of the robot, and receives the signal of the position sensor to monitor abnormal activities of the robot. The safety mode includes at least one of the following types. Safety mode zero is the power off mode. When the safety module determines that the robot should enter into this safety mode, it directly turns off the actuator. Safety mode one is the advanced power off mode. When the safety module determines that the robot should enter into this safety mode, it issues a deceleration command to the controller, so that after the robot decelerates for a period of time, the actuator is turned off. Safety mode two is a non-power off mode. When the safety module determines that the robot should enter into this safety mode, it issues a deceleration command to the controller, and after the robot decelerates for a period of time, a static monitoring safety function is turned on to monitor the position sensor. When any movement of the robot is detected, it then turns off the actuator.

The demonstrator is couple to the controller for programming the robot or operating and controlling the robot. The human-machine interface is coupled to the controller, or can be installed on the demonstrator. The human-machine interface is for displaying programming screen or operating procedures or control software screen. The enable device is disposed to or installed in the demonstrator, or installed at an end of the robot, or externally coupled to the controller by a user. The mode designator is knobs, multi-level buttons, and a physical button for pressing multiple times on the demonstrator, or a software or virtual button on the human-machine interface.

These and other objectives of the present invention will no doubt become obvious to those of ordinary skill in the art after reading the following detailed description of the preferred embodiment that is illustrated in the various figures and drawings.

DETAILED DESCRIPTION

With regard to the technical means and effects adopted by the present invention to achieve the above-mentioned objective, the preferred embodiment is described below in conjunction with the drawings.

In order to comply with the safety standard ISO 10218-1, the robot should have the following operating modes: automatic mode and manual (teaching) mode. The teaching mode includes a manual reduced speed mode and a manual high-speed mode. The automatic mode is defined as the robot automatically runs a program for automated production. The user here is a production line operator. The manual (or teaching) mode is for the programming and testing the robotic programs not for automated production operations. The user here is an automation engineer. The manual reduced-speed mode is used for teaching, programming, and low-speed program testing, while the manual high-speed mode is for regular program testing, such as the full speed program testing. It is similar to the automatic mode but requires additional safety mechanism. So, the enable device on the demonstrator must be continually pressed to ensure safety.

The hand-guiding function is only defined as a collaboration function in ISO 10218-1, but it is not clearly stated which purpose it is used for. The safety regulations have not yet been defined for the hand-guiding function. At present, the hand-guiding function has been used in various operation modes, most commonly in manual (or teaching) mode. It is convenient for automation engineers to do points demonstration and paths dragging. In addition, it is also common in automatic mode to facilitate production line operators to carry out the following tasks: hand-guiding movement (such as guiding the robot to the next starting point), hand-guiding demonstration (such as hand-guiding demonstration of the work path), hand-guiding collaboration (such as the robot lifting a weight while a human operator guiding its placement position). The hand-guiding function in the automatic mode is not the teaching mode in the safety regulation, but the hand-guiding function in the automated production. The hand-guiding function can be widely used in automatic mode, manual (or teaching) mode.

Figure 1:
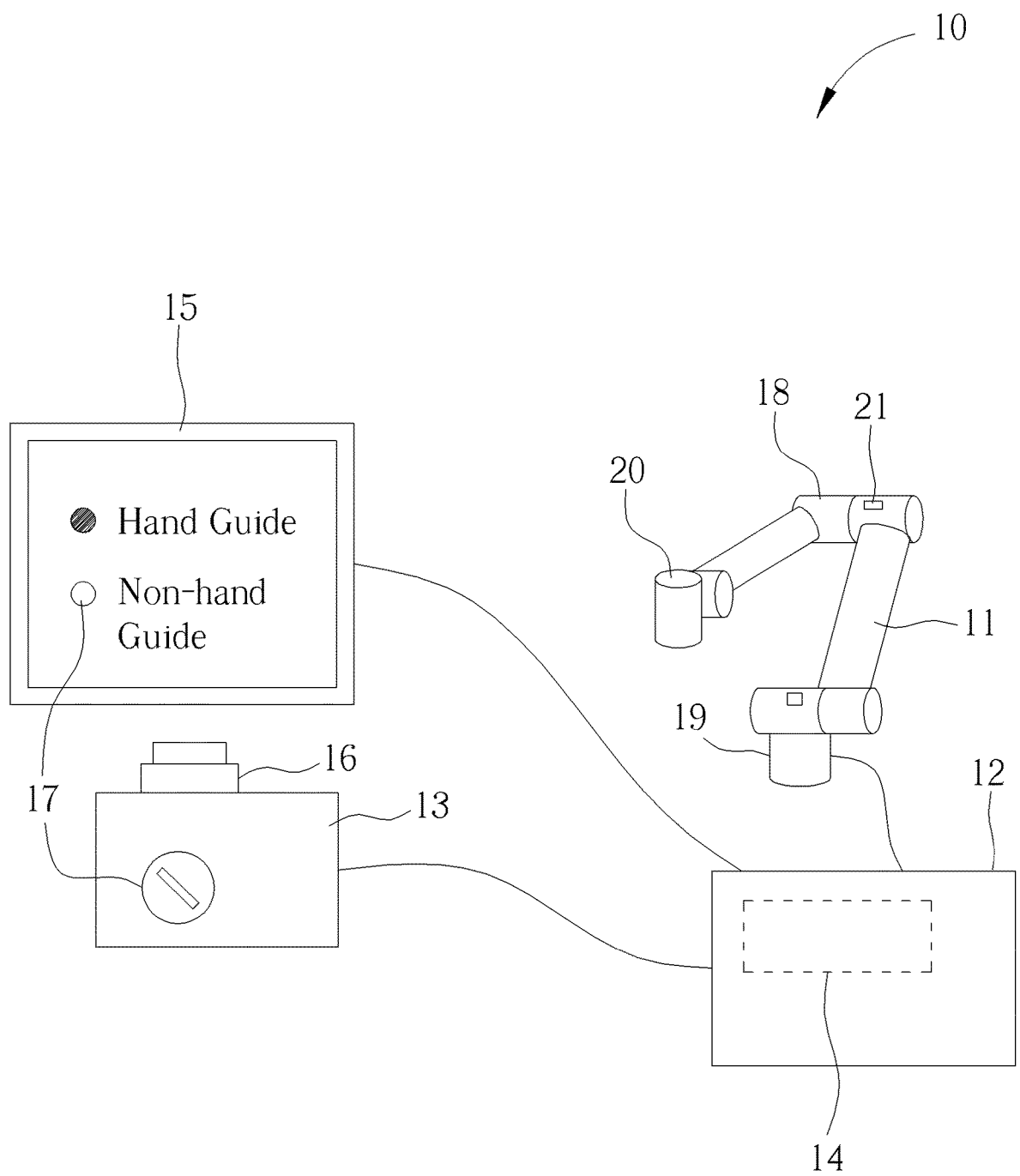
FIG. 1 is a diagram of a robot system with the hand-guiding function of an embodiment of the present invention.
Figure 2:
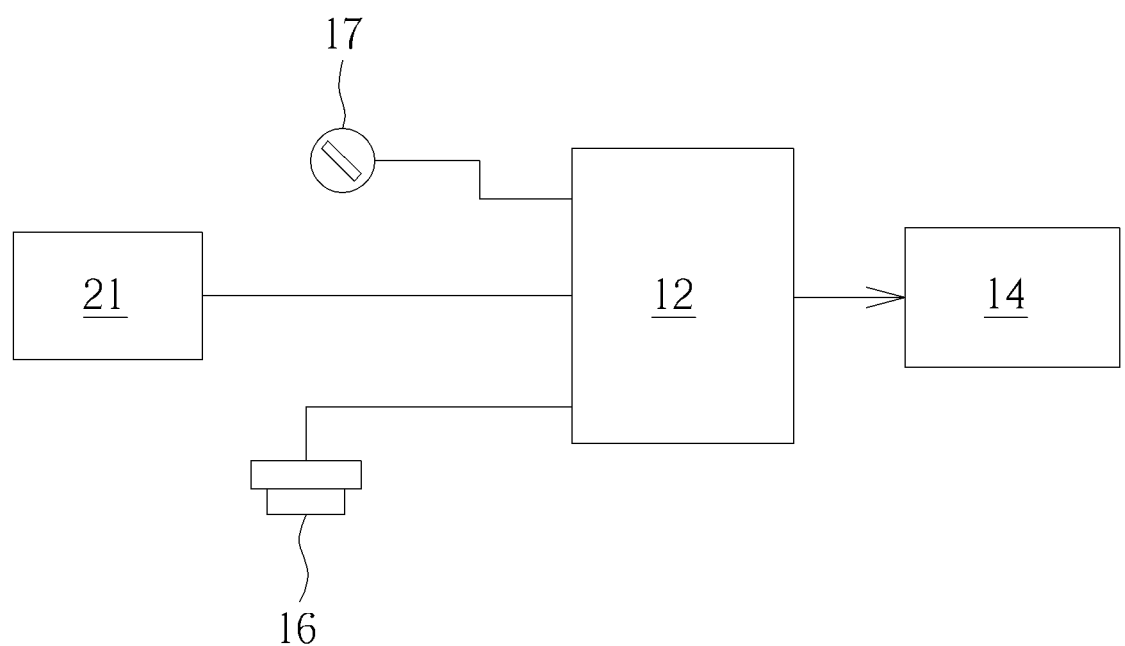
FIG. 2 is a diagram of the safety control of the robot system in FIG. 1.
Figure 3:
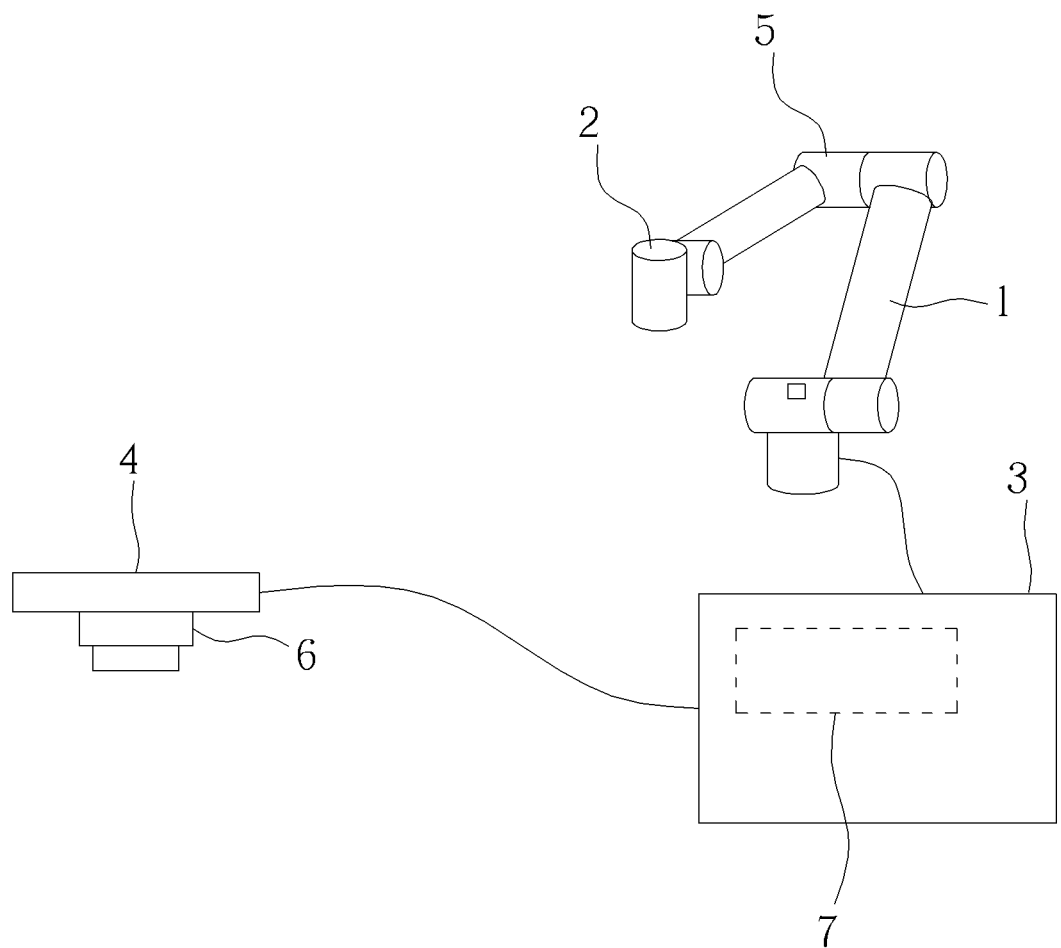
FIG. 3 is a diagram of a robot system with the hand-guiding function of the prior art.

Please refer to both FIGS. 1 and 2. FIG. 1 is a diagram of a robot system 10 with the hand-guiding function of an embodiment of the present invention. FIG. 2 is a diagram of the safety control of the robot system in FIG. 1. In FIG. 1, the robot system 10 includes a robot 11, a controller 12, a demonstrator 13, a human-machine interface 15, an enable device 16, and a mode designator 17 and a plurality of toggles 18. The robot 11 includes one end being a fixed base 19, and the other end being a movable end 20. The robot 11 is coupled to the controller 12, which includes a safety module 14. The controller 12 controls the moveable end 20 by controlling the actuator and a position sensor 21 in each toggle 18. Each toggle 18 also includes a position sensor 21 coupled to the safety module 14. The demonstrator 13 is couple to the controller 12 for programming the robot 11 or operating and controlling the robot 11. The human-machine interface 15 is coupled to the controller 12, or can be disposed to or installed on the demonstrator 13. The human-machine interface 15 is for displaying programming screen or operating procedures or control software screen. The controller 12 can be a central processor unit, ASIC (Application Specific Integrated Circuit) or any other ICs (integrated circuits) for the application.

The embodiment also includes an enable device 16 on the demonstrator 13. The enable device 16 is a three-position enabling switch with three pressing modes: released, middle, and pressed. When released and pressed are both in the OFF position (OFF state or turned off), the middle position is in the ON position (ON state or turned on). Although the enable device 16 is installed on the demonstrator 13 in this embodiment, it is just an illustrative example. The embodiment is not limited to this. It can also be built in the demonstrator 13, or disposed at the moveable end 20 of the robot 11. Moreover, the enable device 16 can be externally coupled to the controller 12 or the enable device 16 can be set disposed at more than one of the aforementioned positions. The mode designator 17 can be knobs, multi-level buttons or a physical button for pressing multiple times on the demonstrator 13. It can also be a software or virtual button on the human-machine interface 15.

In FIG. 2, the safety module 14 is electrically or communicatively coupled to the enable device 16, the mode designator 17 and the position sensor 21 via the controller 12. The enable device 16 has a switching state such as ON state and OFF state. When the enable device 16 is ON, the safety module 14 cancels the safety mode of the robot 11. When the enable device 16 is OFF, the safety module 14 stops the robot 11 causing the robot 11 to enter into the safety mode. The safety module 14 is electrically or communicatively connected to the position sensor 21 at each toggle 18. The safety module 14 can receive signals from the position sensor 21 to monitor the activity of the robot 11.

The safety module 14 stops the robot 11 and controls it to enter into one of three types of the safety modes. For instance, safety mode zero is the power off mode. When the safety module 14 determines that the robot 11 should enter into this safety mode, it directly turns off the actuator. Safety mode one is the advanced power off mode. When the safety module 14 determines that the robot 11 should enter into this safety mode, it issues a deceleration command to the controller 12, so that after the robot decelerates for a period of time (may be a fixed time) or by an inspection, the actuator is turned off. Safety mode two is a non-power off mode. When the safety module 14 determines that the robot 11 should enter into this safety mode, it issues a deceleration command to the controller 12, and after the robot decelerates for the period of time (may be a fixed time) or by the inspection, a static monitoring safety function is turned on to monitor the position sensor 21. When any movement of the robot is detected, it then turns off the actuator.

When the robot 11 is in the teaching mode or the automatic mode, there would be human-machine collaboration using the hand-guiding mode. In order to ensure the convenience and safety of the human operators in different modes of operation, the mode designator 17 allows the user to designate the enable device 16 to operate in a hand-guiding mode or a non-hand-guiding mode. The mode designator 17 can be a knob, multi-level buttons or a physical button for pressing multiple times on the demonstrator 13. The indication of the hand-guiding mode or the non-hand-guiding mode can also be marked on the mode designator 17 and can be selected by turning or pressing. The mode designator 17 can also be software or virtual buttons on the human-machine interface 15. The controller 12 can control and set the robot 11 to the hand-guiding or non-hand-guiding mode according to the signal received from the mode designator 17.

When the controller 12 receives the signal of the mode designator 17 and designates the enable device 16 to operate in the hand-guiding mode, the controller 12 makes the enable device 16 to form a hand-guiding enable device, which has the function of a hand-guiding robot button in addition to the function of the enable device 16. When the enable device 16 is ON, the safety module 14 cancels the safety mode of the robot 11, and at the same time enables the robot 11 to hand-guiding mode. The user can move the robot 11 with hand-guiding without having to press other hand-guiding buttons. When the enable device 16 is OFF, the safety module 14 stops the robot 11 and the robot 11 enters into the safety mode. The safety module 14 also monitors any abnormal activity of the robot 11, and stops the hand-guiding mode of the robot 11 to ensure the safety of the human operator.

When the controller 12 receives the signal from the mode designator 17 and designates the enable device 16 to operate in the non-hand-guiding mode, the controller 12 keeps the enable device 16 to its original function state. It cannot have the function of the hand-guiding robot button. When the enable device 16 is ON, the safety module 14 cancels the safety mode of the robot 11, but cannot enable the robot 11 to the hand-guiding mode, and the robot 11 cannot be moved with hand-guiding. When the enable device 16 is OFF, the safety module 14 stops the robot 11 and the robot 11 enters into the safety mode, and the robot 11 cannot be moved with hand-guiding.

The aforementioned hand-guiding mode allows the user to directly drag the robot 11 to a desired posture and position, or to record the spatial trajectory of the hand-guiding process. The tasks that can be applied to the non-hand-guiding mode include teaching, auxiliary teaching, or verification programs. For example, it includes inching operations for each joint axis, robot orthogonal coordinate axis and end tool coordinate system axis directions. It also includes robot calibration, movement to a specific position, or performing a single-step programming operation, etc. These operations are only examples of the operations to which the mode designator 17 can be applied, but the invention is not limited to this.

In summary, the robot system with the hand-guiding function of the present invention can set the enable device to have the hand-guiding function or the non-hand-guiding function in the teaching mode or the automatic mode operation by using the mode designator. It can designate the enable device with the hand-guiding function, so that the enable device has the functions of both an enable device and a hand-guiding for the robot without pressing the hand-guiding button. It achieves the purpose of safe and convenient hand-guiding robot operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A robot system with hand-guiding function, comprising:
  a robot, comprising:
    a plurality of toggles, each of the plurality of toggles comprising an actuator; and
    a movable end;
  a controller, coupled to the robot, and configured to control the actuator to move the movable end of the robot;
  an enable device, coupled to the controller; and
  a mode designator, electrically or communicatively coupled to the controller, and configured to designate the enable device to operate in a hand-guiding mode or a non-hand-guiding mode;
  wherein:
    the controller comprises a safety module, electrically or communicatively coupled to the enable device, and is configured to output a signal according to a switching state of the enable device for making the robot entering a safety mode or canceling the safety mode of the robot;
    when the mode designator designates the enable device to operate in the hand-guiding mode, the controller allows the enable device to have functions of the enable device and a hand-guiding for the robot; and
    when the mode designator designates the enable device to operate in the non-hand-guiding mode, the controller maintains the enable device to its original function.

2. The robot system of claim 1, wherein when the enable device is operating in the hand-guiding mode, the controller makes the enable device as a hand-guiding enable device.

3. The robot system of claim 2, wherein:
  when the enable device is operating in the hand-guiding mode and the enable device is turned on, the safety module cancels the safety mode of the robot and enables the hand-guiding mode of the robot; and
  when the enable device is operating in the hand-guiding mode and the enable device is turned off, the safety module stops the robot and makes the robot to enter the safety mode and disables the hand-guiding mode of the robot.

4. The robot system of claim 1, wherein:
  when the enable device is operated in the non-hand-guiding mode and the enable device is turned on, the safety module cancels the safety mode of the robot, and does not enable the hand-guiding mode of the robot; and when the enable device is operated in the non-hand-guiding mode and the enable device is turned off, the safety module makes the robot to stop and enter the safety mode.

5. The robot system of claim 1, wherein each toggle further comprises a position sensor coupled to the safety module, and when the robot enters the safety mode, the safety module monitors abnormal activities of the robot through the position sensor.

6. The robot system of claim 1, wherein the safety module comprises at least one type of the safety modes:
  safety mode zero: directly turning off the actuator when entering the safety mode;
  safety mode one: in the safety mode after a deceleration command is issued to the controller, the robot decelerating for a period of time and turning off the actuator; and
  safety mode two: in the safety mode after the deceleration command is issued to the controller, the robot decelerating for the period of time, turning on a static monitoring safety function to monitor the position sensor, and when a movement of the robot is detected, turning off the actuator.

7. The robot system of claim 1, wherein the controller is coupled to a demonstrator and a human-machine interface, the demonstrator is configured to program the robot or to control the robot, the human-machine interface is configured to display a program, operation procedures or a control screen.

8. The robot system of claim 7, wherein the enable device is disposed to or installed in the demonstrator, or installed at an end of the robot, or externally coupled to the controller by a user.

9. The robot system of claim 7, wherein the mode designator is knobs, multi-level buttons or a physical button for pressing multiple times on the demonstrator.

10. The robot system of claim 7, wherein the mode designator is a software or virtual button on the human-machine interface.

* * * * *